Figure 1:
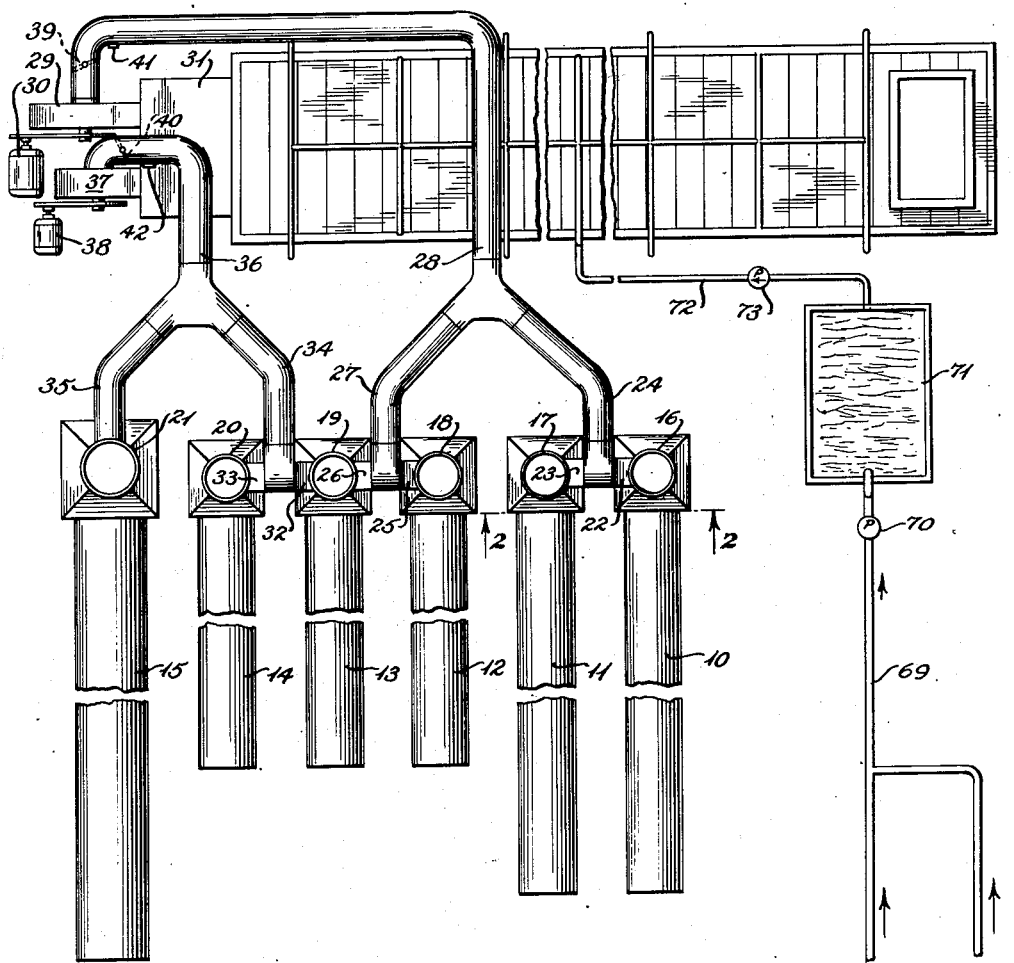

Dec. 7, 1954  A. F. OLD  2,696,274
AIR AND GAS TREATMENT SYSTEM
Filed June 15, 1953  2 Sheets-Sheet 2
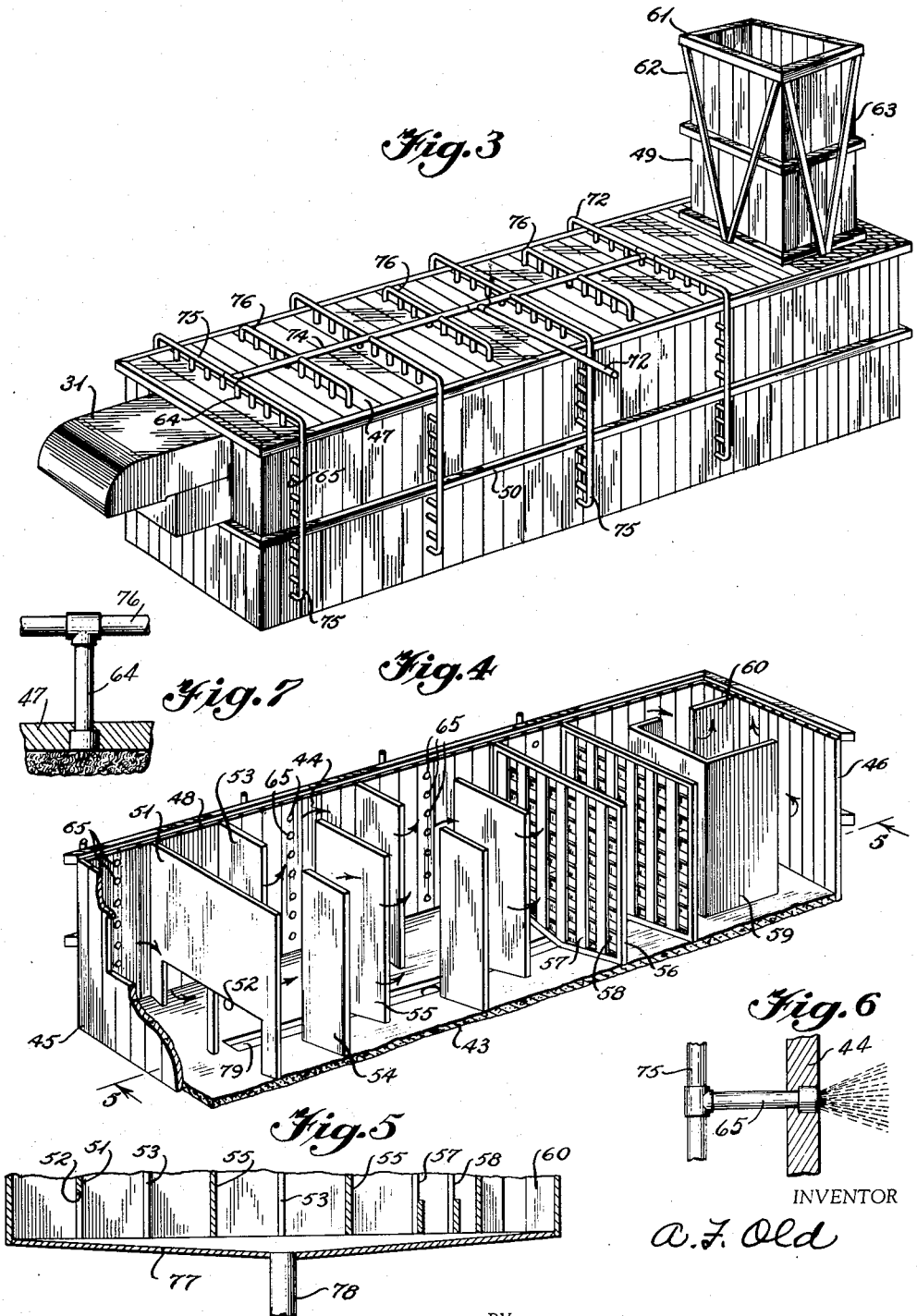
INVENTOR
A. F. Old
BY
A. Yates Dowell
ATTORNEY United States Patent Office 2,696,274
Patented Dec. 7, 1954

2,696,274

AIR AND GAS TREATMENT SYSTEM

Albert F. Old, Bremo Bluff, Va., assignor to Southern Lightweight Aggregate Corporation, Richmond, Va.

Application June 15, 1953, Serial No. 361,888

9 Claims. (Cl. 183—21)

This invention relates to the treatment of air and gas and more particularly to the removal therefrom of substances, either gaseous or solid, which are injurious to animal or plant life.

The present invention pertains specifically to the treatment of gaseous mixtures discharged from stacks at the ends of kilns, rotary or of other types, in which materials are subjected to heat treatment with the resultant release of chemical substances of various kinds as well as fine particles of the products treated and generally referred to as dust.

In plants where large operations are performed, pollution of the atmosphere is a substantial problem on which considerable money and energy have been expended in an effort to solve the same. Attempts have been made to solve the problem by the use of a cyclonic separator, however these have not proved successful and a second specially designed cyclonic separator was tried but likewise proved to be inadequate.

Since there was considerable discharge into the atmosphere a very substantial portion of which was solid matter or dust, it was considered advisable to try to preclean by a wet treatment. When this was first tried, the results were encouraging but only for a short time due to the insides of the device being eroded away. In an effort to overcome this problem, a collector was made and lined with a special concrete. This device was put into operation and once more the initial results were encouraging but the device still was unsatisfactory and in fact a failure as holes were eaten in the housing of the structure and the special concrete lining disintegrated.

During these efforts to solve the problem of removing deleterious substances from the air and gas mixture discharged from the stacks of the kilns, the plant where the attempts at solution weer being conducted was expanded so that instead of two rotary kilns, there were now six and the wet collector with the special concrete lining was used only in an attempt to clean the discharge from only two kilns which was a portion of the kiln gas being discharged.

From the trials and failures, it appeared desirable to provide a collection chamber which would not disintegrate and in which intimate contact could be had for an extended period between the gaseous dust laden mixtures discharged from the stacks and water for cooling and to remove chemical substances which would react to produce strong acids and other corrosive substances as well as to remove solid particles. It also seemed necessary to construct the collection chamber of a material having greater resistance to heat and chemical reaction than metal or argillaceous or ceramic materials. Unexpectedly it was discovered that wood specially treated to resist heat and acid would satisfy the necessary requirements.

It is an object of the invention to provide equipment for the treatment for the necessary time and intimacy of high temperature air and gas mixture containing corrosive chemicals and dust particles in order to cool and remove sufficient amounts of the same so that the atmospheric air into which they are discharged will be harmless to animal and vegetable life.

Another object of the invention is to provide a treating plant including mechanism for handling a mixture containing corrosive chemical and solid matter in varying volume so that a portion can be treated without regard to the treatment of the remaining portion, and in which the energy required for operation can be utilized in proportion to the requirements.

Another object of the invention is to provide a treating plant employing readily obtainable materials, requiring minimum technical skill in its manufacture and attention during its use, and which is relatively simple and inexpensive to produce and the cost of operation of which is nominal.

Figure 2:
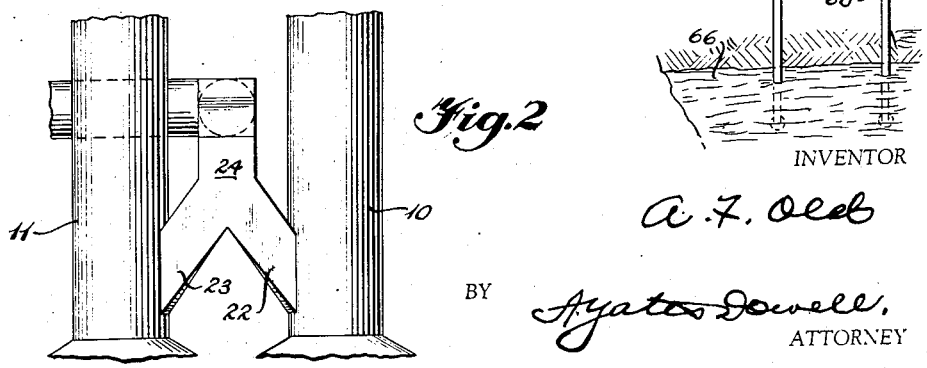

Other objects and advantages will become apparent from the following description taken in conjunction with the accompanying drawings in which Fig. 1 is a diagrammatic plan view;
Fig. 2, a transverse section on the line 2—2 of Fig. 1;
Fig. 3, a perspective of the treating chamber of the present invention;
Fig. 4, a perspective similar to Fig. 3 with parts broken away to disclose the interior of the treating chamber;
Fig. 5, a fragmentary sectional view of the lower portion of the treating chamber and drain therefor;
Fig. 6, a fragmentary detail view illustrating one of the spray nozzles; and
Fig. 7, a similar view of one of the fog nozzles.

Briefly stated, the present invention comprises a treating chamber into which a mixture of air, gas and solids and fine particles, of relatively high temperature, are introduced through a duct by means of a blower or fan. The treating chamber is composed of wood, fir having been found satisfactory, cut and specially treated to render it resistant to heat, acid and other chemical agents. It is preferably elongated, with a width of 15', a height of 15', and a length of from 50' to 70'. The wood is preferably tongue and grooved and fitted together tightly and with a discharge stack from its outlet end. Baffles are employed within the chamber for increasing the length of the path traveled by the mixture treated in the chamber. The first baffle or partition extends entirely across the chamber in slightly spaced relation from the bottom of the chamber so that gas passes beneath the same. Additional baffles are spaced along the chamber alternate baffles extending from each side of the chamber to a point near the center, leaving a central passage, and other baffles being disposed at the center and with spaces around the same one at each side of the chamber. The last two baffles which are located adjacent the discharge end of the chamber extend from floor to ceiling and from side to side of the chamber. These baffles are of latticework formed of strips providing small passages distributed over substantially the entire area of the wall.

The chamber is provided with fog nozzles spaced over the area of its ceiling for the discharge of water horizontally in a fog to produce intimate contact with or thoroughly wet the substance treated during its downward travel. The chamber also is provided with vertical opposed rows of inwardly directed spray nozzles through which a substantially solid vertical curtain of water is sprayed into the chamber. The introduction of water in this manner produces the desired contact and washing of the mixture treated.

Water is supplied to the nozzles through pipes from a reservoir in which a supply of water is maintained at all times, such reservoir being filled from any desired source and controls being employed for maintaining an adequate supply of water in such reservoir. It will be apparent that the air and gas mixture containing solid particles at a relatively high temperature, harmful if not fatal to animal and vegetable life, will have its harmful constituents removed so that when discharged into and diluted by being mixed with the atmosphere, it will be harmless.

With continued reference to the drawings, for purpose of illustration, a series of rotary kilns 10, 11, 12, 13, 14 and 15 are illustrated having stacks 16, 17, 18, 19, 20 and 21 respectively. Six of these kilns are illustrated although this number may be varied in accordance with requirements. The first five of these kilns are 6'4" in diameter with stacks 4' in diameter, and the sixth kiln is 8' in diameter with a stack 5' in diameter. The first two of the kilns are 100' in length, the third, fourth and fifth are 80' in length, and the sixth is 110' in length.

These kilns are employed in the manufacture of a light-weight aggregate. The raw material is mined, crushed, and discharged into kilns where it is subjected to heat treatment to remove the heavy constituents and the resultant product is crushed and sold as the light-weight aggregate. In the manufacture of the product, the raw material is mined, crushed, elevated and dumped or discharged through a feeder shute into kilns containing from one to five per cent moisture. The moist substance encounters a temperature of from 150° to 400° in the kiln causing the moisture to be vaporized and chemical reactions to occur, which with the fine solid particles, produces a cloud containing such chemical substances along with the air, gas and solid particles or dust. This cloud which frequently contains substances such as sulphur, is withdrawn for treatment while the larger solid particles travel along the kiln as it is revolved and are cooked until discharged in the form of light clinkers which are crushed and sold.

Mixtures to be treated are taken from the first and second kilns 10 and 11 through ducts 22 and 23 which are brought together into a third duct 24, and from the third and fourth kilns 12 and 13 through fourth and fifth ducts 25 and 26 which are brought together into a sixth duct 27. The third and sixth ducts 24 and 27 connect to a 36" duct 28 powered by a 100 H. P. blower or fan 29 and driven by a 100 H. P. constant speed motor 30, such 36" duct 28 being connected to discharge through the blower or fan 29 into the inlet duct 31 of the treatment chamber. Notwithstanding the fact that mixtures to be treated are taken from the first four kilns, an additional duct 32 is taken from kiln 13 and a similar duct 33 is taken from kiln 14. The ducts 32 and 33 are connected to a 30" duct 34. A second 30" duct 35 from kiln 15 and the duct 34 connect with a 36" duct 36 powered by a 75 H. P. blower or fan 37 driven by a 75 H. P. constant speed motor 38, such duct 36 also discharging into the inlet duct 31 of the treating chamber. Dampers or control valves 39 and 40 are placed in the pipes 28 and 36 on the suction side of each of the blowers or fans between the kiln and the fan to control the flow through the kiln, such dampers may be controlled by pressure-stats 41 and 42. The motors 30 and 38 which drive the fans are of the constant speed type which are started on reduced voltage. The capacity of the fans and ducts are designed in accordance with requirements but are susceptible to variations due to breezes, air currents, back pressure, the height of the stack, and whether or not weather caps are employed.

The treating chamber comprises a bottom, side, front and rear end, and a top wall, 43, 44, 45, 46 and 47 respectively. These walls are composed of wood, fir having been found satisfactory, such wood being cut into lumber and treated to render them resistant to heat, acid and other chemical agents.

The walls preferably are of a size to provide a chamber approximately 15' each in width and height and a length of from 50' to 70'. The lumber is preferably provided with interfitting tongue and groove or other means 48 for forming tight joints between the same. A relatively large stack 49 extends from the upper portion of its discharge end. The side and end walls of the treating chamber are provided along their intermediate portion with a horizontally disposed support 50.

Baffles are employed within the treating chamber for increasing the length of the path travelled by the mixture treated in the chamber. A first baffle 51 is provided with an opening 52 extending from side to side along its bottom edge so that when the mixture to be treated enters the chamber it will engage such baffle and flow beneath the same. Spaced rearwardly of the chamber from the first baffle, are side baffles 53 and 54 which extend along each side of the chamber from top to bottom of the same and terminate inwardly near the center and provide a narrow central vertical passageway between their adjacent edges. Beyond the side baffles 53 and 54 is located a center baffle 55 extending from top to bottom of the chamber with its side edges spaced from the sides of the chamber so that the flow will be around each side of the baffle. A plurality of side baffles 53 and 54 and center baffles 55 may be employed in accordance with requirements and to insure thorough engagement of the mixture treated with the surfaces of the baffles.

In order to provide a finishing touch to the treatment of the mixture one or more baffles extending from top to bottom and side to side of the chamber may be employed, such baffles are formed of lattice-work or of crossed strips, such baffles being formed of frames 56 and vertical and horizontal slats 57 and 58, thus forming a baffle located transversely of the chamber and having passage forming openings distributed over substantially the area of the baffles. Since the vertical slats are on the inlet side, minimum shelf space will be provided for the accumulation of solid matter.

At the discharge end of the chamber, additional baffles 59 and 60 are provided, the baffle 59 having a central portion and side portions of different lengths, the air being caused to pass around such side portions to enter the discharge stack. A baffle 60 may be added to restrict the passage around the short side of the baffle 59. From this space within the area enclosed by the baffle 59 within the chamber the remains of the treated mixture may pass upwardly through the stack 49 to the atmosphere such stack being of the necessary cross sectional area and height so that heated air will flow upwardly and be discharged with a chimney effect or in an accelerated manner. If desired, the stack 49 may have reinforcing supports 61, 62 and 63.

In order to moisten the mixture treated to increase the specific gravity of and wash out undesirable substances and particularly solid particles, water is supplied in abundance to the treating chamber and is distributed therein by means of fog nozzles of conventional construction on the ends of depending pipes 64, extending through the ceiling of the treating chamber. Through these nozzles water is discharged in a horizontal fog or blanket which gravitates to the bottom of the chamber intimately contacting the mixture in the downward movement of the fog and the horizontal movement of the mixture in its flow through the chamber.

In order to insure thorough wetting of the substance treated, the chamber is provided with vertical rows of pipes 65 having inwardly directed spray nozzles along the side wall of the chamber. The spray nozzles at one side of the chamber are opposite the spray nozzles on the other side of the chamber and such spray nozzles are of conventional construction and of a character to cause the projection of a substantially solid or continuous curtain of water across the chamber. The introduction of water in the manner described insures the desired contact in washing of the mixture treated.

Water for use in the chamber may be obtained from any desired source as for example from a stream 66 through pipes 67 and 68 approximately 800 feet and through a pipe 69 for an additional elevation of approximately 700 feet all by means of a pump 70, the water being collected in a cylindrical supply tank 71 of 2000 gallon capacity or of a capacity corresponding to requirements. Water is taken from the tank 71 through a pipe 72 by means of a pump 73 to a multiple header 74 for supplying the individual headers 75 and 76 with water which is discharged through the pipes 64 and 65. The bottom of the chamber is provided with a trough or sump 77 and a discharge outlet 78 so that water and substance removed from the mixture treated can be readily discharged from the chamber, it having been found that as a practical matter the water can be discharged into the river from which it was taken and its pH value will increase between the time it leaves the chamber and the time it reaches the river.

In the discharge from the treating chamber, tests reveal no detectable amount of carbon monoxide, although there have been small percentages of carbon dioxide and oxygen with approximately five times as much oxygen as carbon dioxide. Small amounts of sulphur have been detected but these have been insufficient ot cause harmful results due to the fact that they are immediately diluted by the air into which they are discharged from the device. No noticeable concentration of any undesirable constituents has been noted at ground level and harmful effects on vegetation have not been detectable. Tests have revealed no appreciable amounts of hydrogen sulphide or dioxide leaving the treating chamber. By actual tests the gas from the kilns before entering the heating chamber contains plus or minus five parts of hydrogen sulphide per million parts of gas, while no detectable amount has been found from the exhaust from the treating chamber.

The acidity of the gas in the exhaust from the kiln has been found to be 3.25, however, the degree of acidity is reduced to such extent that no damage to the surrounding animal and vegetable life has been noted.

The temperature of the mixture entering the treating chamber is approximately 300° F. while the temperature of the exhaust from the treating chamber is 120° F. The temperature of the water entering the treating chamber is 64° F., that from the outlet 120° F., while the pressure of the water is approximately 50 lbs. per sq. in. Acidity (pH) of the water supply used in the treating chamber has been found to be 5.0 while that of the water discharged through the drain at the bottom of the collector has been found to have a pH factor of 3.5, and the water below the settling basin, a pH of 4.0. In view of the fact that a neutral liquid has a pH of 7, it is apparent that the water supply for the water treating chamber is on the acid side, and after coming into contact with the mixture of air, gas and solid particles, it becomes slightly more acid. From the above determination, it will be apparent that the discharge water from the settling basin has decreased in acidity.

Samples have been collected and tested to determine the total amount of solids suspended in the exhaust from the treating chamber. A measurable amount of gas was drawn through paper thimbles in order to collect solid material. These samples disclosed substantially uniform values of 0.022 gram per cu. ft. of gas, which is less than the maximum dust loading requirements of many city pollution ordinances.

Samples of dusts suspended in the exhaust from the treating chamber were collected by a midget impinger. These particles were placed on plates and 200 from each sample were measured and the medium sized particles were found to be 1.0 micron (one twenty-five thousandth of an inch) while the composite samples showed that 90% of the particles were under 2.5 microns and thus it was necessary to use a microscope in order to see these particles which were too small to be seen by the naked eye. Dust particles of the medium size will settle in still air at the rate of five inches per hour, consequently, since there is always some air movement, it is possible for these particles to travel miles before touching the earth. However, it is during such time that a tendency for dilution is encountered, so that dust concentration becomes less as the distance from the plant increases.

The treating chamber of the present invention was first operated with the mixture from three kilns introduced to the collector by one fan. The water supply was inadequate, being below five pounds pressure. At that time a sample was taken from the exhaust from the treating chamber and showed a concentration of slightly more than three hundred million particles per cu. ft. After, the second fan was installed so that the mixture from all the kilns was carried to the treating chamber and the water supply was increased to approximately 40 pounds per sq. in. With additional nozzles added another dust sample was collected from the discharge from the treating chamber and in this sample there was found to be 217 millions of particles per cu. ft.

The device of the present invention removes sufficient chemicals and solids that the discharge from the treating chamber is neither harmful nor obnoxious. Ordinarily dust collection is unsuccessful unless high pressure, for example several hundred pounds per sq. in., is applied to the water discharged from the nozzles and it is obvious that the present invention operates at a pressure of only a tenth of what would normally be expected. The explanation of this is believed to be because the high temperature of the mixture treated probably vaporizes the water from the nozzles so that the particles are thus wet and thereby the concentration and deposit of such particles. Further the discharge from the treating chamber show small acid contents.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. Mechanism for the treatment of a high temperature gaseous mixture containing solid particles therein comprising walls forming an elongated treating chamber having an inlet and an outlet, said walls being composed of wood treated to render them resistant to acid and heat, baffles in said chamber for increasing the length of the path of travel between said inlet and outlet, certain of said baffles being arranged in opposed spaced pairs extending inwardly from top to bottom of opposite side walls and with a central passage between them, other of said baffles being disposed transversely of said chamber in a position to obstruct such a passage, additional baffles disposed transversely of said chamber and having openings located over substantially the entire area of the same for spreading the flow over a large transverse area, fog producing nozzles spread about the upper portion of said chamber for producing fog in a substantially horizontal blanket, nozzles in pairs of vertical rows one at each side of said chamber with the nozzles at one side in alignment with those at the other side of said chamber, producing spaced transverse curtains of water in said chamber, means for supplying water to said nozzles and for forcing mixture to be treated through said chamber so that said mixture to be treated will be caused to travel in contact with and around said baffles through said fog and curtains of water, and a drainage outlet centrally of the bottom of said chamber.

2. Mechanism for the treatment of a high temperature gaseous mixture containing solid particles therein comprising walls forming an elongated treating chamber having an inlet and an outlet, said walls being composed of wood treated to render them resistant to acid and heat, baffles in said chamber for increasing the length of the path of travel between said inlet and discharge openings, certain of said baffles being arranged in pairs extending inwardly from top to bottom of opposite side walls and with their innermost edges in spaced relation providing a central passage, other of said baffles being disposed centrally of said side walls and providing passage around the same, and additional baffles disposed transversely of the chamber and having passage-forming openings distributed over the same, nozzles in spaced relation in the upper portion of said chamber, said nozzles being of a character to produce fog in substantially a horizontal blanket, nozzles in spaced vertical rows along each side of said chamber with the nozzles at one side in alignment with the nozzles at the other side of said chamber, the nozzles in said vertical rows being constructed and arranged to produce spaced curtains of water in said chamber, means for supplying water to said nozzles and for forcing the mixture to be treated through said chamber so that said mixture will be caused to travel in a circuitous path through said curtains of water and subject to the downward movement of said fog, and a drainage outlet from the bottom of said chamber.

3. Mechanism for the treatment of a high temperature gaseous mixture containing solid particles therein comprising walls forming an elongated treating chamber having an inlet and an outlet, said walls having exposed surfaces of wood on which particles may cling and form a protective coating, said wood being treated to render them resistant to acid and heat, baffles in said chamber for increasing the length of the path of travel between said inlet and outlet, certain of said baffles being arranged in pairs extending inwardly from top to bottom of opposite side walls and with their innermost edges in spaced relation providing a central passage, other of said baffles being disposed centrally of said side walls and providing passage around the same, additional baffles disposed transversely of the chamber and having passage-forming openings distributed over the same, the path of flow around and between said baffles being substantially constant and avoiding throttling of flow, and means for introducing moisture in the form of fog along the upper portion of the chamber.

4. Mechanism for the treatment of a high temperature gaseous mixture containing solid particles therein comprising walls forming an elongated treating chamber having an inlet and an outlet said walls having exposed surfaces resistant to acid and heat on which particles may cling and form a protective coating, baffles in said chamber for increasing the length of the path of travel between said inlet and discharge openings, certain of said baffles being arranged in pairs extending inwardly from top to bottom of opposite side walls and with their innermost edges in spaced relation providing a central passage, other of said baffles being disposed centrally of said side walls and providing passage around the same, additional baffles disposed transversely of the chamber and having passage-forming openings distributed over the same, the arrangement of the baffles providing for the tortuous substantially horizontal unthrottled flow of the gaseous mixture through said chamber, and fog nozzles disposed across the top and spray nozzles in alignment down the sides of said chamber at spaced intervals for providing a fog and curtains of moisture in said chamber for intimate contact with the mixture treated and means for forcing mixture to be treated through said chamber to cause it to be acted upon by said finely divided moisture.

5. Mechanism for the treatment of a high temperature gaseous mixture containing solid particles therein comprising walls forming an elongated substantially horizontally disposed treating chamber having an inlet and outlet, said walls having exposed surfaces resistant to acid and heat on which particles may cling and form a protective coating, baffles in said chamber for increasing the length of the path of travel between said inlet and discharge openings, the path of flow around and between said spaced baffles being substantially constant and avoiding appreciable throttling of flow, means for introducing moisture in finely divided form into said chamber, and means for forcing gaseous mixture through said chamber so that it will come into contact with said baffles and said moisture.

6. A system for the treatment of a gaseous mixture containing particles of solids in finely divided form comprising a chamber having exposed surfaces of wood on which particles may cling and provide a protective coating said wood being treated to render it resistant to acid and heat, baffles in said chamber for increasing the length of the path of travel between said inlet and discharge openings, the path of flow around and between said spaced baffles being substantially constant and avoiding appreciable throttling of flow, means for introducing moisture in finely divided form into said chamber, means for forcing gaseous mixture through said chamber so that it will come into contact with said baffles and said moisture, said baffles including a lattice-work wall extending from side to side and top to bottom of said chamber for spreading the mixture treated.

7. In a system which involves the crushing of solids, the introduction with a small amount of moisture of the crushed material containing chemical substances, and some of which material is in finely divided form into areas where the material is subjected to heat and a gaseous mixture is produced containing particles of dust, withdrawing portions of the mixture at relative high temperature under suction from a plurality of such heated areas, controlling the portions of the mixture withdrawn, introducing the withdrawn portions into an area for treatment, providing a series of acid resistant surfaces against which the mixture is caused to impinge, said surfaces being spaced to provide substantially uniform flow area between and around the same, supplying moisture in finely divided form into said area for treatment in a manner to wet and cool said surfaces and the mixture introduced to thereby remove and flush away parts of the mixture treated and discharge the remainder so that it may mix with the air and become diluted and harmless.

8. In the production of a lightweight aggregate, the steps of crushing the solid material employed, introducing the crushed material containing a slight amount of moisture and chemical substances and some of which is in finely divided form into heating areas where the material is subjected to heat causing the creation of a high temperature gaseous mixture containing particles of dust, withdrawing some of such high temperature mixture by suction, controlling the amount withdrawn, treating the mixture withdrawn to cool remove and flush away portions thereof including dust, such treating including providing contact of the mixture and treating surfaces in a substantially uniform unthrottled path of flow, supplying moisture in finely divided form for wetting such surfaces and the mixture, and spreading such mixture during such treatment.

9. A series of heating elements for producing relatively high temperatures, means whereby crushed material may be subjected to the heat from said heating elements, stacks for the discharge of the lighter components of the material heated, means for withdrawing the high temperature mixture, means for controlling the amount of high temperature mixture withdrawn in accordance with the condition of the outside atmosphere, means for treating the high temperature mixture withdrawn to cool remove and dissipate portions thereof, said means for treating including walls defining a chamber having surfaces resistant to acid and heat, means providing a series of surfaces against which the mixture is caused to impinge, said surfaces being spaced to provide substantially uniform flow areas between and around the same, and means for supplying moisture in finely divided form into said treating chamber in a manner to wet and cool said surfaces and the mixture introduced.

References Cited in the file of this patent

UNITED STATES PATENTS

| Number | Name | Date |
| --- | --- | --- |
| 704,199 | Lee | July 8, 1902 |
| 1,112,860 | Smith | Oct. 6, 1914 |
| 1,297,639 | Blumenberg | Mar. 18, 1919 |